(No Model.)
A. P. MASSEY.
AIR BRAKE.
No. 535,844. Patented Mar. 19, 1895.
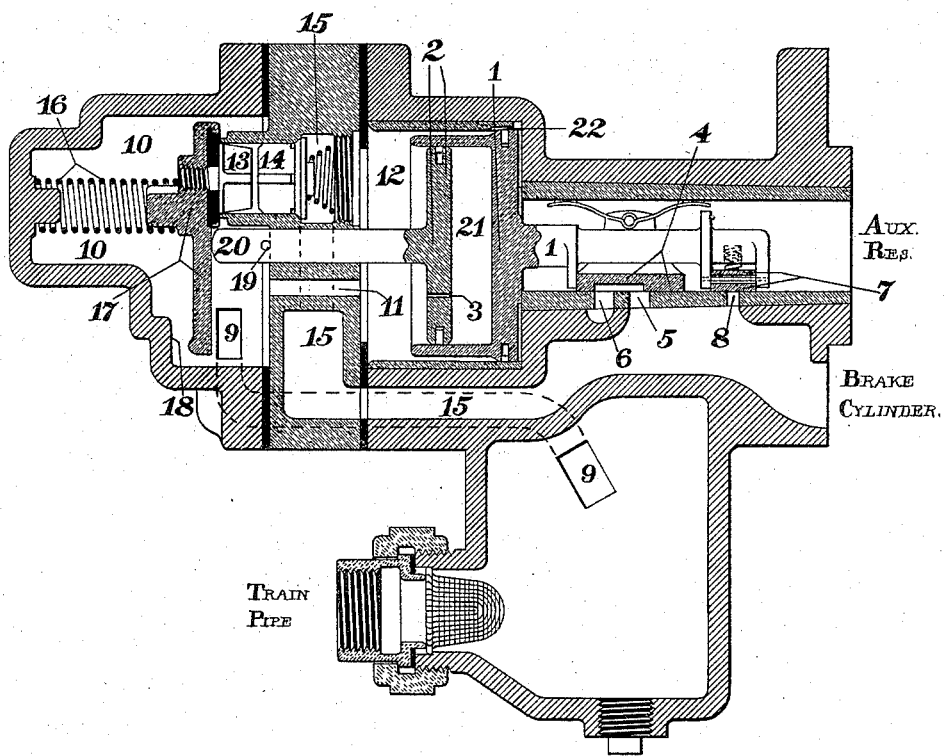
WITNESSES:
INVENTOR
Albert P. Massey

UNITED STATES PATENT OFFICE.

ALBERT P. MASSEY, OF WATERTOWN, NEW YORK.

AIR-BRAKE.

SPECIFICATION forming part of Letters Patent No. 535,844, dated March 19, 1895.

Application filed January 10, 1895. Serial No. 534,419. (No model.)

*To all whom it may concern:*

Be it known that I, ALBERT P. MASSEY, a citizen of the United States, and a resident of Watertown, Jefferson county, State of New York, have invented a new and useful Improvement in Air-Brakes, of which the following is a specification.

The object of my invention is to obtain all the functions of a quick acting automatic brake with an apparatus in which the piston of the triple valve has the same travel for either slow or quick applications. The speed of the piston determines whether the local vent from the train pipe shall be opened or not.

In general respects this apparatus does not differ from the quick acting triple valve used in the usual automatic brake system consisting of a continuous train pipe and an auxiliary reservoir and a brake cylinder under each car.

The drawing is a longitudinal section through the center of the apparatus with the connections to the train pipe, the auxiliary reservoir and the brake cylinder plainly marked.

1 is the ordinary triple valve piston one side of which has a cylindrical recess in which piston 2 is fitted.

3 is a small opening through piston 2 through which air may pass to equalize the pressure on its opposite sides.

4 is an exhaust valve controlling connection between port 5, which is connected to the brake cylinder and port 6 which is open to the atmosphere.

7 is an application valve controlling the port 8 between the auxiliary reservoir and the brake cylinder. These valves are operated by the piston 1 in the usual way, that is, when piston 1 is as shown, the brake cylinder is open to the atmosphere through valve 4 and its ports while valve 7 is closed. When piston 1 is at the other end of its stroke, valve 7 does not cover port 8 and the auxiliary reservoir is open to the brake cylinder, while valve 4 has closed port 5 and cut off the opening from the brake cylinder to the atmosphere.

9 is a large passage connecting the train pipe with a chamber 10 in the cap.

11 is a passage connecting chamber 10 with chamber 12 in which the pistons are located.

13 is a valve controlling a vent from the train pipe.

14 is a check valve in the vent. 15 is a passage connecting said vent with the brake cylinder.

16 is a spring tending to keep valve 13 on its seat.

17 is an arm of valve 13 which fulcrums on shoulder 18 when the valve is partly open.

19 is a pin passing through stem 20 of piston 2, which limits the motion of piston 2 in a right hand direction to the position shown in the drawing.

21 is the space between the two pistons.

22 is a charging groove.

When in service compressed air from the train pipe passes through passage 9, chamber 10, passage 11, chamber 12, and charging groove 22 into the auxiliary reservoir, also from chamber 12 through passage 3 to 21. The space between the two pistons, and the pressure in all the above mentioned chambers and the auxiliary reservoir becomes equal.

The passage 3 is made of such a size that when the piston 1 is moved slowly to the left, the air in space 21 will be pressed through passage 3 without making sufficient pressure on piston 2 to overcome the resistance of the spring 16 and the air pressure tending to keep valve 13 on its seat. Therefore the piston 1 may move its whole stroke to the left slowly without opening the vent covered by valve 13. When piston 1 is moved quickly to the left, the air confined in space 21 cannot flow through passage 3 fast enough, and it therefore forces piston 2 to the left with sufficient force to push valve 13 from its seat and vent the train pipe to the brake cylinder through the passage 15. As the passage 3 is always open the confined air in space 21 will gradually pass through the passage from the pressure of the spring 16 on valve 13 and stem 20 until piston 2 has entered its cylinder far enough to allow valve 13 to close the vent. On the return of piston 1 to the position shown in the drawing, the pin 19 prevents the piston 2 from returning farther than the position shown, and air passes through passage 3 to fill space 21 to the same pressure as in chamber 12.

In the process of applying brakes in the ordinary automatic brake systems, the operator reduces the pressure in the train pipe slowly if he wishes a moderate application, and very quickly if he wishes a quick application. When in the normal condition the pressure in the auxiliary reservoir and in chamber 12 is the same as in the train pipe, to which chamber 12 is open, and consequently the pressure on both sides of piston 1 is equal. Upon a reduction of pressure in the train pipe the preponderance of pressure on the reservoir side of piston 1 moves it to the left. In the traverse of piston 1 it first closes charging groove 22; second, closes exhaust valve 4, and, third, opens port 8 between the auxiliary reservoir and the brake cylinder. If the reduction in the train pipe is slow, the air confined in space 21 will have time to flow through passage 3 and there will be no motion to piston 2. The action above described is called a service stop and occasions a moderate application of the brakes.

If the pressure in the train pipe is quickly reduced, the preponderance of pressure on the reservoir side of piston 1 moves it quickly to the left carrying with it piston 2 (because the confined air in space 21 cannot flow through passage 3 fast enough) which opens valve 13 and vents the train pipe to the brake cylinder. This quick venting of the train pipe rapidly reduces the train pipe pressure and brings succeeding valves into action in the same way. So far as obtaining quick venting of the train pipe the large vents might open to the atmosphere, but it has been found better to connect them to the brake cylinder and utilize part of the energy of the train pipe pressure.

What I claim as new, and desire to secure by Letters Patent, is—

In an automatic brake system normally operated by a triple valve, the combination with the triple valve piston and a vent valve from the train pipe of a cylindrical chamber forming part of the triple valve piston, a second piston in said cylindrical chamber and an air space closed by the second piston and a small passage between the two sides of the second piston so that the motion of the triple valve piston may actuate the second piston to open the vent valve or not depending on the speed with which the triple valve piston is moved, substantially as set forth.

In testimony that I claim the foregoing as my invention I have signed my name, in presence of two witnesses, this 8th day of January, 1895.

ALBERT P. MASSEY.

Witnesses:
M. J. MORKIN,
H. D. MORGAN.